(12) United States Patent
Zhu et al.

(10) Patent No.: US 11,846,268 B2
(45) Date of Patent: Dec. 19, 2023

(54) WIND POWER GENERATION TRANSMISSION SYSTEM

(71) Applicant: Nanjing High-speed Gear Manufacturing Co., Ltd., Jiangsu (CN)

(72) Inventors: Lian Zhu, Jiangsu (CN); Bo Zhang, Jiangsu (CN); Dongfang Jia, Jiangsu (CN); Chunyun Xiao, Jiangsu (CN); Aimin He, Jiangsu (CN); Yizhong Sun, Jiangsu (CN)

(73) Assignee: NANJING HIGH-SPEED GEAR MANUFACTURING CO., LTD., Jiangsu (CN)

( * ) Notice: Subject to any disclaimer, the term of this patent is extended or adjusted under 35 U.S.C. 154(b) by 16 days.

(21) Appl. No.: 17/532,112

(22) Filed: Nov. 22, 2021

(65) Prior Publication Data
US 2023/0003196 A1    Jan. 5, 2023

(30) Foreign Application Priority Data

Jul. 1, 2021    (CN) .......................... 202110743734.9

(51) Int. Cl.
*F03D 15/00*        (2016.01)
*F16H 1/46*         (2006.01)
(Continued)

(52) U.S. Cl.
CPC .............. *F03D 15/00* (2016.05); *F16H 1/46* (2013.01); *F16H 57/021* (2013.01);
(Continued)

(58) Field of Classification Search
CPC . F03D 15/00; F03D 9/25; F03D 80/00; F16H 1/46; F16H 57/021; F16H 57/082;
(Continued)

(56) References Cited

U.S. PATENT DOCUMENTS

| | | | |
|---|---|---|---|
| 2010/0009799 A1* | 1/2010 | Ciszak .................... | F16C 35/06 475/159 |
| 2010/0207396 A1* | 8/2010 | Simon ...................... | H02P 9/06 290/55 |

(Continued)

FOREIGN PATENT DOCUMENTS

| CN | 101377186 A | 3/2009 |
|---|---|---|
| CN | 101649810 A | 2/2010 |

(Continued)

OTHER PUBLICATIONS

European Search Report issued by the European Patent Office in connection with International Application No. 21213058.7, dated Jul. 6, 2022.

*Primary Examiner* — J. Todd Newton
(74) *Attorney, Agent, or Firm* — George Likourezos; Carter, DeLuca & Farrell LLP

(57) ABSTRACT

Provided is a wind power generation transmission system. A first sun gear is a hollow gear. The first sun gear includes a first end surface and a second end surface opposite to the first end surface. A second planetary carrier includes a third connection end. An outer circumferential surface of the third connection end is provided with external splines. An inner circumferential surface of the first sun gear is provided with internal splines. The third connection end of the second planetary carrier extends from the second end surface to the first end surface and is disposed in the first sun gear so that the external splines of the third connection end are connected to the internal splines of the first sun gear.

20 Claims, 2 Drawing Sheets

(51) Int. Cl.
 *F16H 57/021* (2012.01)
 *F16H 57/08* (2006.01)
 *F16H 57/02* (2012.01)

(52) U.S. Cl.
 CPC .. *F16H 57/082* (2013.01); *F05B 2260/40311* (2013.01); *F16H 2057/02034* (2013.01); *F16H 2057/02078* (2013.01)

(58) Field of Classification Search
 CPC . F16H 2057/02034; F16H 2057/02078; F16H 2057/02086; F16H 57/0025; F16H 57/023; F16H 57/08; F05B 2260/40311
 See application file for complete search history.

(56) References Cited

U.S. PATENT DOCUMENTS

2021/0095755 A1\* 4/2021 Haake ................ F16H 57/0423
2021/0131402 A1\* 5/2021 Zhao ....................... F03D 80/70

FOREIGN PATENT DOCUMENTS

| CN | 201535236 U | 7/2010 |
|----|-------------|--------|
| WO | 2022034040 A1 | 2/2022 |

\* cited by examiner

WIND POWER GENERATION TRANSMISSION SYSTEM

CROSS-REFERENCE TO RELATED APPLICATION(S)

This application claims priority to Chinese Patent Application No. 202110743734.9 filed Jul. 1, 2021, the disclosure of which is incorporated herein by reference in its entirety.

TECHNICAL FIELD

The present application relates to the technical field of wind power gearboxes and, in particular, to a wind power generation transmission system with a wind power gearbox.

BACKGROUND

As a renewable energy source, wind power develops increasingly rapidly, achieves energy substitution function, and promotes the optimization of an energy consumption structure, which is not only the development requirement of the entire energy industry and the social economy, but also the development goal of the wind power industry. In recent years, with the continuous development of wind power generation technology, the wind power industry is about to usher in an entire era of fair price, which requires higher power generation efficiency, lower cost per kilowatt-hour, and higher economic benefits. With technological progress and industrial chain development, small-power units will be further replaced by high-power units. However, as the power becomes larger, the volume and weight of a gearbox are getting larger and larger, which is not only difficult for machining, but also extremely difficult for transportation, assembly, and hoisting. Therefore, "lightweight" of the wind power unit is a development trend and focus of technology research and development in the wind power industry in the future. The traditional wind power gearbox is connected to a wheel hub through a main shaft, and a rear end of the main shaft is connected to a planetary carrier of the gearbox by a shrink disk or flange to transmit torque, and thus that the structure of the traditional wind power gearbox is relatively complicated and bulky.

Therefore, it is necessary to design a new wind power generation transmission system.

SUMMARY

An object of the present application is to provide a wind power gearbox with a compact structure and relatively small space occupation.

To achieve this object, the present application adopts solutions described below.

A wind power generation transmission system includes a wind power gearbox including a box body and a planetary gearset disposed in the box body; where the box body includes an inner ring gear cooperating with the planetary gearset, and the planetary gearset includes at least a first-stage planetary gearset and a second-stage planetary gearset; the first-stage planetary gearset includes a first planetary carrier, a plurality of first planetary gears rotatably supported on the first planetary carrier, and a first sun gear rotatably disposed in the box body around a rotation axis of the first-stage planetary gearset; the second-stage planetary gearset includes a second planetary carrier, a plurality of second planetary gears rotatably supported on the second planetary carrier, and a second sun gear rotatably disposed in the box body around a rotation axis of the second planetary gearset; the inner ring gear includes a first inner ring gear cooperating with the plurality of first planetary gears and a second inner ring gear cooperating with the plurality of second planetary gears, each of the plurality of first planetary gears is meshed with both the first inner ring gear and the first sun gear, and each of the plurality of second planetary gears is meshed with both the second inner ring gear and the second sun gear; the first sun gear is a hollow gear, the first sun gear includes a first end surface and a second end surface opposite to the first end surface, the second planetary carrier includes a third connection end, an outer circumferential surface of the third connection end is provided with external splines, an inner circumferential surface of the hollow gear is provided with internal splines, and the third connection end of the second planetary carrier extends from the second end surface to the first end surface and is disposed in the hollow gear so that the external splines of the third connection end are connected to the internal splines of the hollow gear.

DETAILED DESCRIPTION

Figure 1:
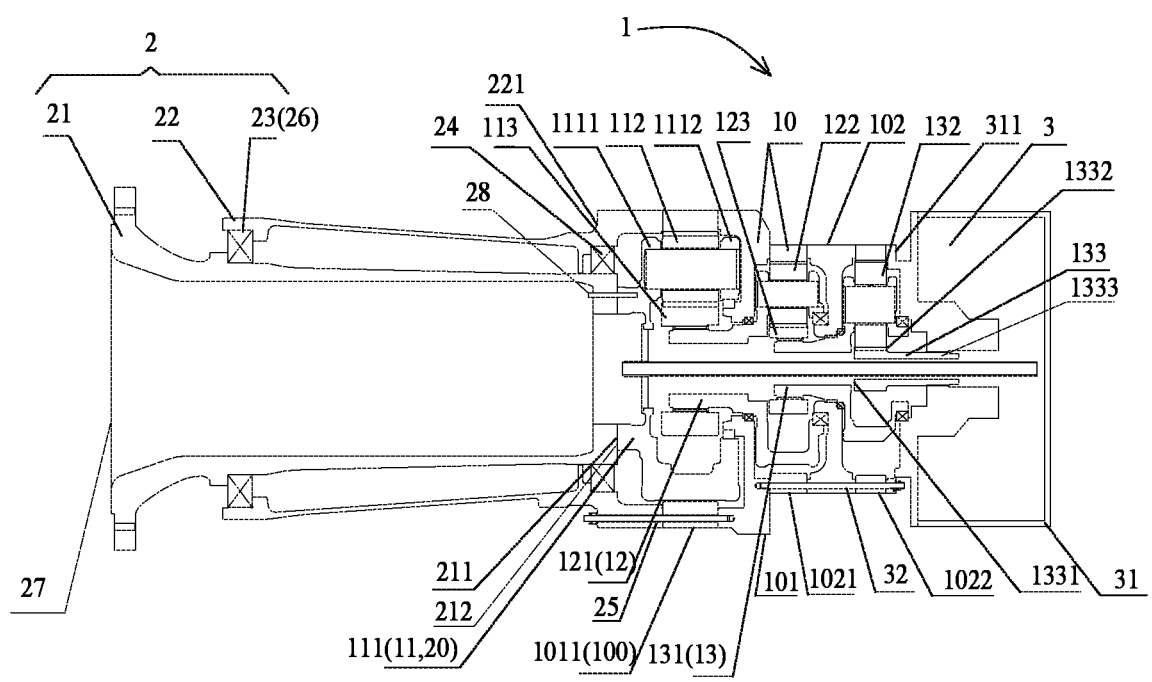
FIG. 1 is a structure view of a wind power generation transmission system according to the present application.

The present application is further described hereinafter in detail in conjunction with drawings and embodiments. It is to be understood that the embodiments described herein are intended to explain the present application and not to limit the present application. Additionally, it is to be noted that for ease of description, merely part, not all, of the structures related to the present application are illustrated in the drawings.

In the description of the present application, unless otherwise expressly specified and limited, the term "connected to each other", "connected", or "fixed" is to be construed in a broad sense, for example, as permanently connected, detachably connected, or integrated; mechanically connected or electrically connected; directly connected to each other or indirectly connected to each other via an intermediary; or internally connected or interactional between two components. For those of ordinary skill in the art, specific meanings of the preceding terms in the present application may be construed based on specific situations.

In the present application, unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of this embodiment, the orientation or position relationships indicated by terms "above", "below", "right" and the like are based on the orientation or position relationships shown in the drawings, merely for ease of description and simplifying an operation, and these relationships do not indicate or imply that the referred device or element has a specific orientation and is constructed and operated in a specific orientation, and thus it is not to be construed as limiting the present application. In addition, the terms "first" and "second" are used only to distinguish between descriptions and have no special meaning.

The present application provides a wind power generation transmission system 100. As shown in FIG. 1, the wind power generation transmission system 100 includes a wind power gearbox 1, a main shaft system 2 connected to the wind power gearbox 1, and a generator 3 connected to the wind power gearbox 1. The generator 3 is configured to generate electricity under the driving of the wind power gearbox 1. In an embodiment, rotation axes of a planetary gearset 20, the main shaft system 2, and the generator 3 in the wind power gearbox 1 are the same.

The wind power gearbox 1 includes a box body 10 and the planetary gearset 20 in the box body 10. In an embodiment, the planetary gearset 20 includes a first-stage planetary gearset 11 adjacent to the main shaft system 2, a third-stage planetary gearset 13 adjacent to the generator 3, and a second-stage planetary gearset 12 disposed between the first-stage planetary gearset 11 and the third-stage planetary gearset 13. In an embodiment, a sun gear shaft of the third-stage planetary gearset 13 is an output shaft of the wind power gearbox 1, and the generator 3 generates electricity under the driving of the sun gear shaft.

The box body 10 includes a first box body 101 adjacent to the main shaft system 2 and a second box body 102 adjacent to the generator 3. The first box body 101 is provided with a first inner ring gear 1011 cooperating with the first-stage planetary gearset 11, and the second box body 102 is provided with a second inner ring gear 1021 cooperating with the second-stage planetary gearset 12 and a third inner ring gear 1022 cooperating with the third-stage planetary gearset 13.

The first-stage planetary gearset 11 includes a first planetary carrier 111, multiple first planetary gears 112 rotatably supported on the first planetary carrier 111, and a first sun gear 113 rotatably disposed in the box body 10 around a rotation axis of the first-stage planetary gearset 11, where each of the first planetary gears 112 is meshed with both the first inner ring gear 1011 and the first sun gear 113. The second-stage planetary gearset 12 includes a second planetary carrier 121 connected to the first sun gear 113, multiple second planetary gears 122 rotatably supported on the second planetary carrier 121, and a second sun gear 123 rotatably disposed in the box body 10 around a rotation axis of the second-stage planetary gearset 12, where each of the second planetary gears 122 is meshed with both the second inner ring gear 1021 and the second sun gear 123. The third-stage planetary gearset 13 includes a third planetary carrier 131 connected to the second sun gear 123, multiple third planetary gears 132 rotatably supported on the third planetary carrier 131, and a third sun gear 133 rotatably disposed in the box body 10 around a rotation axis of the third-stage planetary gearset 13, where each of the third planetary gears 132 is meshed with the third inner ring gear 1022 and the third sun gear 133.

The main shaft system 2 includes a main shaft 21 connected to the first-stage planetary gearset 11, a main shaft bearing seat 22 connected to the box body 10, and a main shaft bearing 26 configured to support the main shaft 21 on the main shaft bearing seat 22, where the main shaft bearing 26 is disposed between a blade side 27 and the first planetary carrier 111. In an embodiment, the main shaft bearing 26 includes a first main shaft bearing 23 and a second main shaft bearing 24. In an embodiment, the main shaft 21 includes a first connection end 211 connected to the first planetary carrier 111, the first planetary carrier 111 includes a second connection end 212 corresponding to the first connection end 211, and the first connection end 211 is connected to the second connection end 212 by a second bolt 28. The second bolt 28 penetrates from the first connection end 211 along a direction of a rotation axis of the main shaft 21 into the second connection end 212 for stable installation of the first planetary carrier 111 and the main shaft 21, so that while the first planetary carrier 111 is supported by the main shaft 21, the stability of the wind power generation transmission system during operation is ensured. The first main shaft bearing 23 is disposed facing away from the first connection end 211 and adjacent to the blade side 27, and the second main shaft bearing 24 is disposed at the first connection end 211 adjacent to the first planetary carrier 111. The main shaft bearing seat 22 is connected to the first box body 101 by a first bolt 25. For example, the first bolt is a long bolt. In an embodiment, the main shaft bearing seat 22 includes a first outer side surface 221 adjacent to the second main shaft bearing 24. The first bolt 25 penetrates the first inner ring gear 1011 from the first outer side surface 221 along a direction parallel to the rotation axis of the main shaft 21, and is then connected to the first box body 101, so that the main shaft bearing seat 22 is stably connected to the first box body 101. In this manner, while the main shaft bearing seat 22 and the first box body 101 are fixed together, the stability of the wind power generation transmission system during operation is ensured. Since the main shaft 21 is supported on the main shaft bearing seat 22 connected to the box body 10 and the first planetary carrier 111 is supported by the main shaft 21, the first planetary carrier 111 can be supported on the box body 10 without using a bearing (it is to be understood that the first planetary carrier 111 and the main shaft 21 share the bearing). In this manner, while the structure of the first-stage planetary gearset 11 is simplified, the cost is reduced.

In other embodiments, only one or more main shaft bearing 26 may be provided, as long as the main shaft bearing 26 is disposed between the blade side 27 and the first connection end 211 and can support the main shaft 21.

To further reduce the space of the wind power generation transmission system and a dimension of the wind power gearbox 1, a radial dimension of the second connection end (212) is not greater than a radial dimension of the first connection end 211.

The generator 3 includes a casing 31 connected to the inner ring gear 100 of the box body 10. In an embodiment, the casing 31 is connected to the second inner ring gear 1021 and the third inner ring gear 1022 by a third bolt 32. In an embodiment, the casing 31 includes a second outer side surface 311. The third bolt 32 sequentially penetrates the third inner ring gear 1022 and the second inner ring gear 1021 from the second outer side surface 311 along a direction parallel to a rotation axis of the output shaft, and is then connected to the first box body 101, so that the stability and smoothness of the connection are ensured. A rotor shaft (not shown in the figure) of the generator 3 and the output shaft of the wind power gearbox 1 are connected through splines.

In an embodiment, one end of the wind power gearbox 1 of the wind power generation transmission system is connected to the main shaft system 2 by the first bolt 25 and the second bolt 28 and the other end of the wind power gearbox 1 is connected to the casing 31 of the generator 3 by the third bolt 32, so that the wind power gearbox 1, the main shaft system 2, and the generator 3 are integrated together. Compared with the wind power generation transmission system in the related art, to the greatest extent, the wind power generation transmission system of the present application can save space, reduce weight, and control cost to the greatest extent.

Figure 2:
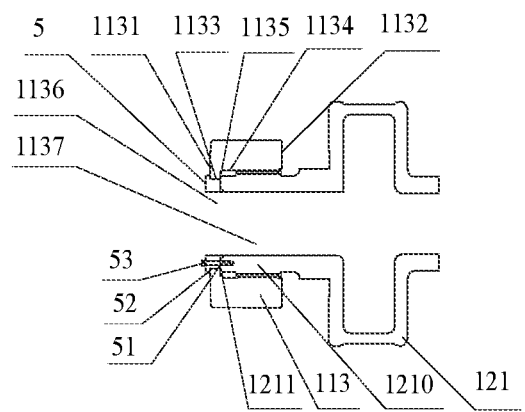
FIG. 2 is a structure view illustrating that a positioning member positions a first sun gear in a floating manner according to embodiment one of the present application.
Figure 3:
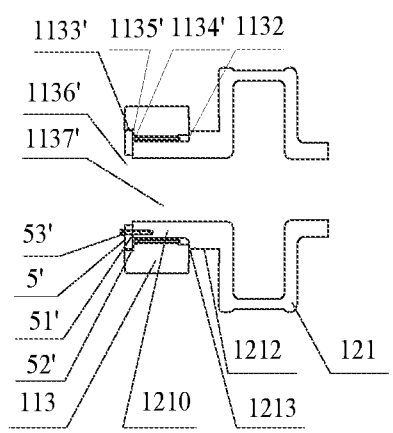
FIG. 3 is a structure view illustrating that a positioning member positions a first sun gear in a floating manner according to embodiment two of the present application.

In conjunction with FIGS. 2 and 3, the first planetary carrier 111 includes a first web 1111 adjacent to the main shaft system 2 and a second web 1112 adjacent to the second-stage planetary gearset 12 and opposite to the first web 1111. The first sun gear 113 is a hollow gear. The first sun gear 113 includes a first end surface 1131 adjacent to the first web 1111 and a second end surface 1132 adjacent to the second web 1112. The first end surface 1131 and the second end surface 1132 are disposed between the first web 1111 and the second web 1112 along a direction of the rotation axis of the first-stage planetary gearset 11. The second planetary carrier 121 includes a third connection end 1210 provided with external splines. An outer circumferential surface of the first sun gear 113 is provided with external teeth meshing with the first planetary gears 112, and an inner circumferential surface of the first sun gear 113 is provided with internal splines connected to the external splines of the third connection end 1210. The third connection end 1210 of the second planetary carrier 121 extends from the second end surface 1132 of the first sun gear 113 to the first end surface 1131 of the first sun gear 113 and is disposed in the hollow gear, so that the first planetary gearset is connected to the second planetary gearset through the internal splines and the external splines. In an embodiment, the first sun gear 113 is the hollow gear penetrating from the first end surface 1131 to the second end surface 1132, and the internal splines of the first sun gear 113 are disposed between the first end surface 1131 and the second end surface 1132. In this manner, on the one hand, the weight of the first sun gear 113 can be reduced, which is more conducive to the lightweight of the wind power gearbox 1; on the other hand, the third connection end 1210 is disposed in the hollow gear when the first planetary carrier 111 is connected to the first sun gear 113 so that the axial dimension of the wind power gearbox 1 can be further reduced. It is to be understood that, compared with the related art in which a sun gear shaft extends from an end surface of a first sun gear adjacent to a second-stage planetary gearset 12 and is provided with external splines on an outer circumferential surface of the sun gear shaft and a second planetary carrier of the second-stage planetary gearset 12 is provided with internal splines connected to the external splines, the present application provides a solution that the inner circumferential surface of the first sun gear 113 is provided with the internal splines, and the outer circumferential surface of the third connection end 1210 of the second planetary carrier 121 is provided with the external splines connected to the internal splines. In this manner, the dimension of the wind power gearbox can be significantly reduced and thus the structure of the wind power gearbox is more compact.

The first sun gear 113 is connected to the second planetary carrier 121 through splines, and the first sun gear 113 is meshed with the first planetary gears 112. Due to gear backlash exists when the first sun gear 113 is meshed with the first planetary gears 112, the first sun gear 113 during operation floats due to the gear backlash and force.

The second planetary carrier 121 and the first sun gear 113 are provided with resisting surfaces capable of resisting each other. The first sun gear 113 transmits a received axial force to the second planetary carrier 121 through the resisting surfaces, and the planetary carrier 121 withstands the axial force. A positioning member 5 or 5' is fixed to the second planetary carrier 121, and a gap exists between the positioning member 5 or 5' and the first sun gear 113. When the first sun gear 113 floats, the gap between the positioning member 5 or 5' and the first sun gear 113 can allow the first sun gear 113 to float and the positioning member 5 or 5' can withstand the axial force generated when the first sun gear 113 floats. In an embodiment, the third connection end 1210 of the second planetary carrier 121 includes a third end surface 1211, the positioning member 5 or 5' includes a positioning surface 51 or 51' fixed on the third end surface 1211 and a limiting surface 52 or 52' configured to axially limit the first sun gear 113, a gap exists between the limiting surface 52 or 52' and the first sun gear 113, and the limiting surface 52 or 52' can withstand the axial force when the first sun gear 113 floats. In an embodiment, the positioning member in the present application is made of a wear-resistant material.

For ease of understanding, the structure of the positioning member is explained below through two embodiments.

Embodiment One

As shown in FIG. 2, the first sun gear 113 includes a first inner hole 1136 and a second inner hole 1137, and the first inner hole 1136 is adjacent to the first web 1111 relative to the second inner hole 1137. An inner circumferential surface of the first inner hole 1136 is a first inner circumferential surface 1133, and an inner circumferential surface of the second inner hole 1137 is a second inner circumferential surface 1134. Internal splines of the first sun gear 113 are disposed on the second inner circumferential surface 1134, the inner diameter of the first inner hole 1136 is less than the inner diameter of the second inner hole 1137, and a first step surface 1135 is formed between the first inner circumferential surface 1133 and the second inner circumferential surface 1134. The third connection end 1210 is disposed in the second inner hole 1137, the external splines of the third connection end 1210 are connected to the internal splines on the second inner circumferential surface 1134, and the first step surface 1135 is disposed between the limiting surface 52 and the third end surface 1211. In this embodiment, the third end surface 1211 and the first step surface 1135 are equivalent to the resisting surface of the first sun gear 113 and the resisting surface of the first planetary carrier 111 abutted against each other, respectively. When the wind power gearbox generates an axial force during operation, the third end surface 1211 is abutted against the first step surface 1135, and the first sun gear 113 transmits the received axial force to the third end surface 1211 through the first step surface 1135, so as to transmit the axial force to the second planetary carrier 121.

The positioning member 5 is fixed on the third end surface 1211 by a fourth bolt 53, the limiting surface 52 is disposed on one side of the first end surface 1131 adjacent to the main shaft system 2, and a gap exists between the limiting surface 52 and the first end surface 1131 of the first sun gear 113, where the gap can satisfy floating requirements of the first sun gear 113.

In embodiment one, the first inner circumferential surface 1133 is disposed between the positioning surface 51 and the limiting surface 52, and the limiting surface 52 is disposed facing away from the third end surface 1211 relative to the first end surface 1131 so that a gap exists between the limiting surface 52 and the first end surface 1131 of the first sun gear 113.

Embodiment Two

As shown in FIG. 3, the second planetary carrier 121 includes a fourth connection end 1212, and a second step surface 1213 capable of abutting against the second end surface 1132 is formed between the fourth connection end 1212 and the third connection end 1210. In this embodiment, the second end surface 1132 and the second step surface 1213 are the resisting surfaces between the first sun gear 113 and the second planetary carrier 121 abutted against each other. When the first sun gear 113 receives an axial force, the second end surface 1132 of the first sun gear 113 transmits the axial force to the second planetary carrier 121 through the second step surface 1213.

The first sun gear 113 includes a first inner hole 1136' and a second inner hole 1137, and the first inner hole 1136' is adjacent to the first web 1111 relative to the second inner hole 1137. An inner circumferential surface of the first inner hole 1136' is a first inner circumferential surface 1133', and an inner circumferential surface of the second inner hole 1137 is a second inner circumferential surface 1134'. Internal splines of the first sun gear 113 are disposed on the second inner circumferential surface 1134', the inner diameter of the first inner hole 1136' is greater than the inner diameter of the second inner hole 1137, and a first step surface 1135' is formed between the first inner circumferential surface 1133' and the second inner circumferential surface 1134'. The third connection end 1210 is disposed in the second inner hole 1137, and the external splines of the third connection end 1210 are connected to the inner splines on the second inner circumferential surface 1134'. The positioning member 5' is disposed in the first inner hole 1136', and the positioning member 5' is fixed to the third end surface 1211 by a fourth bolt 53'. The limiting surface 52' is disposed on one side of the first step surface 1135' adjacent to the main shaft system 2, the first step surface 1135' is disposed between the limiting surface 52' and the second step surface 1213, and a gap exists between the limiting surface 52' and the first step surface 1135' of the first sun gear 113, where the gap can satisfy the floating requirements of the first sun gear 113.

In embodiment two, to facilitate machining and manufacture and simplify the structure, the positioning surface 51' and the limiting surface 52' are overlapped. Since the positioning surface 51' is fixed on the third end surface 1211, to satisfy that the first sun gear 113 is positioned in a floating manner, the limiting surface 52' is disposed facing away from the second step surface 1213 relative to the first step surface 1135' such that the gap exists between the limiting surface 52' and the first sun gear 113. In other embodiments, the positioning surface may also be disposed adjacent to the second step surface relative to the limiting surface. To sum up, as long as it is ensured that a certain distance exists between the limiting surface and the second step surface, the axial floating of the sun gear can be satisfied.

Although only two methods of positioning the first sun gear in the floating manner are described in embodiment one and two, it is to be understood that the specific structure of the positioning member is not limited in the present application, as long as the positioning member has the positioning surface capable of withstanding a certain axial force and the limiting surface between which and the first end surface of the sun gear a certain distance exists. Whether the positioning member is an integral structure or a split structure, where the positioning member is fixed, whether the limiting surface and the positioning surface are overlapping surfaces, and the shape can be easily conceived in this embodiment.

To further reduce the dimension of the wind power gearbox, the structure of the second sun gear 123 of the second-stage planetary gearset 12 adopts the same structure as the first sun gear 113 of the first-stage planetary gearset 11, and the connection structure between the third planetary carrier 131 of the third-stage planetary gearset 13 and the second sun gear 123 of the second-stage planetary gearset 12 is the same as the connection structure between the second planetary carrier 121 of the second-stage planetary gearset 12 and the first sun gear 113 of the first-stage planetary gearset 11. That is, the second sun gear 123 is a hollow gear, the third planetary carrier 131 extends from an end surface of the second sun gear 123 adjacent to the generator 3 to an end surface of the second sun gear 123 adjacent to the first-stage planetary gearset 11 and is disposed in the hollow structure of the second sun gear 123, a part of the third planetary carrier 131 disposed in the second sun gear 123 is provided with external splines, and an inner circumferential surface of the second sun gear 123 is provided with internal splines connected to the external splines on the third planetary carrier 131. Similarly, an axial-force-bearing surface between the second sun gear 123 and the third planetary carrier 131 and the floatingly positioning structure design of the second sun gear also adopt the design of the sun gear and planetary carrier of the previous stage, which is not described in detail herein. A planetary carrier of a latter stage extends into a hollow sun gear of a previous stage, and the external splines on the planetary carrier are connected to the internal splines of the sun gear so that an axial dimension of the wind power generation transmission system is further reduced, the compactness of the wind power generation transmission system is improved, and the miniaturization of the wind power generation transmission system is achieved.

As shown in FIG. 1, the third sun gear 133 of the third-stage planetary gearset 13 includes a fourth end surface 1331 adjacent to the second-stage planetary gearset 12 and a fifth end surface 1332 adjacent to the generator 3. The fifth end surface 1332 extends toward the generator 3 along an axial direction of the third-stage planetary gearset 13 so that a sun gear shaft 1333, that is, an output shaft, is formed. An outer circumferential surface of the third sun gear 133 is provided with external teeth being meshed with the third planetary gears 132, and the sun gear shaft 1333 is connected to the rotor shaft of the generator 3 through splines (not shown in the figure).

To further reduce the volume and weight of the wind power gearbox and the load borne by each planetary gear while reducing the outer diameter of the ring gear, a multi-planetary gear structure is adopted in the present application. In an embodiment, the first-stage planetary gearset 11 includes at least five first planetary gears 112, the second-stage planetary gearset 12 includes at least four second planetary gears 122, and the third-stage planetary gearset 13 includes at least three third planetary gears 132.

Apparently, the preceding embodiments of the present application are merely illustrative of the present application and are not intended to limit embodiments of the present application. Those of ordinary skill in the art can make various apparent modifications, adaptations, and substitutions without departing from the scope of the present application. Implementations of the present application cannot be and do not need to be all exhausted herein. Any modifications, equivalent substitutions, and improvements made within the spirit and principle of the present application fall within the scope of the claims of the present application.

What is claimed is:

1. A wind power generation transmission system, comprising a wind power gearbox, wherein the wind power gearbox comprises a box body and a planetary gearset disposed in the box body; the box body comprises a first box body, the box body comprises an inner ring gear cooperating with the planetary gearset, and the planetary gearset at least comprises a first-stage planetary gearset and a second-stage planetary gearset;

the first-stage planetary gearset comprises a first planetary carrier, a plurality of first planetary gears rotatably supported on the first planetary carrier, and a first sun gear rotatably disposed in the box body around a rotation axis of the first-stage planetary gearset;

the second-stage planetary gearset comprises a second planetary carrier, a plurality of second planetary gears rotatably supported on the second planetary carrier, and a second sun gear rotatably disposed in the box body around a rotation axis of the second-stage planetary gearset;

the inner ring gear comprises a first inner ring gear cooperating with the plurality of first planetary gears and a second inner ring gear cooperating with the plurality of second planetary gears, each of the plurality of first planetary gears is meshed with both the first inner ring gear and the first sun gear, and each of the plurality of second planetary gears is meshed with both the second inner ring gear and the second sun gear;

the first sun gear is a hollow gear, and the first sun gear comprises a first end surface and a second end surface opposite to the first end surface; and the second planetary carrier comprises a third connection end, external splines are disposed on an outer circumferential surface of the third connection end, internal splines are disposed on an inner circumferential surface of the first sun gear, the third connection end of the second planetary carrier extends from the second end surface to the first end surface and is disposed in the first sun gear, and the external splines of the third connection end are connected to the internal splines of the first sun gear;

wherein the first planetary carrier comprises a first web and a second web adjacent to the second-stage planetary gearset, and the first web is opposite to the second web; the first end surface is adjacent to the first web and the second end surface is adjacent to the second web, and the first end surface and the second end surface are both disposed between the first web and the second web along a direction of the rotation axis of the first-stage planetary gearset;

wherein the second planetary carrier and the first sun gear are provided with resisting surfaces capable of resisting each other, the first sun gear is configured to transmit a received axial force to the second planetary carrier through the resisting surfaces, the second planetary carrier is fixed with a positioning member, a gap exists between the positioning member and the first sun gear, and when the first sun gear floats, the gap between the positioning member and the first sun gear is configured to allow the first sun gear to float and the positioning member is capable of withstanding the axial force generated when the first sun gear floats.

2. The wind power generation transmission system of claim 1, wherein the first sun gear is the hollow gear penetrating from the first end surface to the second end surface, the internal splines of the first sun gear are disposed between the first end surface and the second end surface.

3. The wind power generation transmission system of claim 1, wherein the first sun gear comprises a first inner hole and a second inner hole, the first inner hole comprises a first inner circumferential surface and the second hole comprises a second inner circumferential surface, a first step surface is formed between the first inner circumferential surface and the second inner circumferential surface, the third connection end of the second planetary carrier comprises a third end surface, the positioning member comprises a positioning surface and a limiting surface capable of withstanding the axial force when the first sun gear floats, the positioning surface is fixed on the third end surface, and a gap exists between the limiting surface and the first sun gear.

4. The wind power generation transmission system of claim 3, wherein a diameter of the first inner hole is less than a diameter of the second inner hole, the third connection end is disposed in the second inner hole, the third end surface and the first step surface are abutted against each other to form the resisting surfaces, the positioning surface is fixed on the third end surface, the limiting surface is farther from the third end surface relative to the first end surface, the first inner circumferential surface is disposed between the positioning surface and the limiting surface, and a gap exists between the limiting surface and the first end surface.

5. The wind power generation transmission system of claim 3, wherein the second planetary carrier further comprises a fourth connection end, a second step surface is formed between the fourth connection end and the third connection end, the second end surface and the second step surface are abutted against each other to form the resisting surfaces, a diameter of the first inner hole is greater than a diameter of the second inner hole, the third connection end is disposed in the second inner hole, the positioning surface is fixed on the third end surface, the first step surface is disposed between the limiting surface and the second step surface, and a gap exists between the limiting surface and the first step surface.

6. The wind power generation transmission system of claim 5, wherein the positioning surface and the limiting surface are overlapped, and the limiting surface is disposed facing away from the second step surface relative to the first step surface.

7. The wind power generation transmission system of claim 1, further comprising a main shaft system, wherein the first planetary carrier is supported by the main shaft system and rotatable around a rotation axis of the main shaft system.

8. The wind power generation transmission system of claim 7, wherein the main shaft system comprises a main shaft connected to the first planetary carrier, a main shaft bearing seat rigidly connected to the box body, and a main shaft bearing configured to support the main shaft on the main shaft bearing seat, wherein the main shaft comprises a first connection end connected to the first planetary carrier, the main shaft bearing is disposed between a blade side and the first connection end, and the main shaft bearing seat is connected to the box body by a first bolt so that the main shaft bearing seat is integrated with the box body.

9. The wind power generation transmission system of claim 8, wherein the main shaft bearing comprises a first main shaft bearing adjacent to the blade side and a second main shaft bearing adjacent to the first planetary carrier, the main shaft bearing seat comprises a first outer side surface adjacent to the second main shaft bearing, the first inner ring gear is disposed in the first box body, and the first bolt penetrates the first inner ring gear from the first outer side surface along a direction parallel to a rotation axis of the main shaft so that the first bolt is connected to the first box body.

10. The wind power generation transmission system of claim 8, wherein the first planetary carrier comprises a second connection end corresponding to the first connection end, a second bolt penetrates from the first connection end into the second connection end for rigid connection of the first planetary carrier and the main shaft, a radial dimension of the second connection end is not greater than a radial dimension of the first connection end, and the first planetary carrier is supported on the main shaft system through connection between the first connection end and the second connection end.

11. The wind power generation transmission system of claim 1, further comprising a generator, wherein the generator comprises a casing rigidly connected to the inner ring gear of the wind power gearbox, the box body further comprises a second body box, and the casing is connected to the second box body by a third bolt along a direction parallel to a rotation axis of a sun gear shaft so that the generator is integrated with the wind power gearbox.

12. The wind power generation transmission system of claim 11, wherein the planetary gearset further comprises a third-stage planetary gearset connected to the second-stage planetary gearset, the inner ring gear further comprises a third inner ring gear cooperating with the third-stage planetary gearset, the second inner ring gear is disposed in the second box body, the casing comprises a second outer side surface, and the third bolt sequentially penetrates the third inner ring gear and the second inner ring gear from the second outer side surface along the direction parallel to the rotation axis of the sun gear shaft so that the third bolt is connected to the first box body.

13. The wind power generation transmission system of claim 12, wherein the third-stage planetary gearset includes a third planetary carrier connected to the second sun gear, a plurality of third planetary gears rotatably supported on the third planetary carrier, and a third sun gear rotatably disposed in the box body around a rotation axis of the third-stage planetary gearset, wherein each of the plurality of third planetary gears is meshed with the third inner ring gear and the third sun gear.

14. The wind power generation transmission system of claim 13, wherein the second sun gear is a hollow gear, the third planetary carrier extends from an end surface of the second sun gear adjacent to the generator to an end surface of the second sun gear adjacent to the first-stage planetary gearset and is disposed in the second sun gear, part of the third planetary carrier disposed in the second sun gear is provided with external splines, and an inner circumferential surface of the second sun gear is provided with internal splines connected to the external splines on the third planetary carrier.

15. The wind power generation transmission system of claim 14, wherein the third sun gear of the third-stage planetary gearset includes a fourth end surface adjacent to the second-stage planetary gearset and a fifth end surface adjacent to the generator, and the sun gear shaft extends from the fifth end surface toward the generator along an axial direction of the third-stage planetary gearset.

16. The wind power generation transmission system of claim 12, wherein the first-stage planetary gearset comprises at least five first planetary gears, the second-stage planetary gearset comprises at least four second planetary gears, and the third-stage planetary gearset comprises at least three third planetary gears.

17. A wind power generation transmission system, comprising a wind power gearbox and a main shaft system, wherein the wind power gearbox comprises a box body and a planetary gearset disposed in the box body; the box body comprises a first box body, the box body comprises an inner ring gear cooperating with the planetary gearset, and the planetary gearset comprises at least a first-stage planetary gearset and a second-stage planetary gearset;

the first-stage planetary gearset comprises a first planetary carrier, a plurality of first planetary gears rotatably supported on the first planetary carrier, and a first sun gear rotatably disposed in the box body around a rotation axis of the first-stage planetary gearset;

the second-stage planetary gearset comprises a second planetary carrier, a plurality of second planetary gears rotatably supported on the second planetary carrier, and a second sun gear rotatably disposed in the box body around a rotation axis of the second-stage planetary gearset;

the inner ring gear comprises a first inner ring gear cooperating with the plurality of first planetary gears and a second inner ring gear cooperating with the plurality of second planetary gears, each of the plurality of first planetary gears is meshed with both the first inner ring gear and the first sun gear, and each of the plurality of second planetary gears is meshed with both the second inner ring gear and the second sun gear;

the first sun gear is a hollow gear, and the first sun gear comprises a first end surface and a second end surface opposite to the first end surface; and the second planetary carrier comprises a third connection end, external splines are disposed on an outer circumferential surface of the third connection end, internal splines are disposed on an inner circumferential surface of the first sun gear, the third connection end of the second planetary carrier extends from the second end surface to the first end surface and is disposed in the first sun gear, and the external splines of the third connection end are connected to the internal splines of the first sun gear;

wherein the first planetary carrier is supported by the main shaft system and rotatable around a rotation axis of the main shaft system;

wherein the main shaft system comprises a main shaft connected to the first planetary carrier, a main shaft bearing seat rigidly connected to the box body, and a main shaft bearing configured to support the main shaft on the main shaft bearing seat, wherein the main shaft comprises a first connection end connected to the first planetary carrier, the main shaft bearing is disposed between a blade side and the first connection end, and the main shaft bearing seat is connected to the box body by a first bolt so that the main shaft bearing seat is integrated with the box body.

18. The wind power generation transmission system of claim 17, wherein the main shaft bearing comprises a first main shaft bearing adjacent to the blade side and a second main shaft bearing adjacent to the first planetary carrier, the main shaft bearing seat comprises a first outer side surface adjacent to the second main shaft bearing, the first inner ring gear is disposed in the first box body, and the first bolt penetrates the first inner ring gear from the first outer side surface along a direction parallel to a rotation axis of the main shaft so that the first bolt is connected to the first box body.

19. The wind power generation transmission system of claim 18, wherein the first planetary carrier comprises a second connection end corresponding to the first connection end, a second bolt penetrates from the first connection end into the second connection end for rigid connection of the first planetary carrier and the main shaft, a radial dimension of the second connection end is not greater than a radial dimension of the first connection end, and the first planetary carrier is supported on the main shaft system through connection between the first connection end and the second connection end.

20. A wind power generation transmission system, comprising a wind power gearbox and a generator, wherein the wind power gearbox comprises a box body and a planetary gearset disposed in the box body; the box body comprises a first box body, the box body comprises an inner ring gear cooperating with the planetary gearset, and the planetary gearset comprises at least a first-stage planetary gearset and a second-stage planetary gearset;

the first-stage planetary gearset comprises a first planetary carrier, a plurality of first planetary gears rotatably supported on the first planetary carrier, and a first sun gear rotatably disposed in the box body around a rotation axis of the first-stage planetary gearset;

the second-stage planetary gearset comprises a second planetary carrier, a plurality of second planetary gears rotatably supported on the second planetary carrier, and a second sun gear rotatably disposed in the box body around a rotation axis of the second-stage planetary gearset;

the inner ring gear comprises a first inner ring gear cooperating with the plurality of first planetary gears and a second inner ring gear cooperating with the plurality of second planetary gears, each of the plurality of first planetary gears is meshed with both the first inner ring gear and the first sun gear, and each of the plurality of second planetary gears is meshed with both the second inner ring gear and the second sun gear;

the first sun gear is a hollow gear, and the first sun gear comprises a first end surface and a second end surface opposite to the first end surface; and the second planetary carrier comprises a third connection end, external splines are disposed on an outer circumferential surface of the third connection end, internal splines are disposed on an inner circumferential surface of the first sun gear, the third connection end of the second planetary carrier extends from the second end surface to the first end surface and is disposed in the first sun gear, and the external splines of the third connection end are connected to the internal splines of the first sun gear;

wherein the generator comprises a casing rigidly connected to the inner ring gear of the wind power gearbox, the box body further comprises a second body box, and the casing is connected to the second box body by a third bolt along a direction parallel to a rotation axis of a sun gear shaft so that the generator is integrated with the wind power gearbox.

* * * * *